Sept. 8, 1931.　　　A. D. MIZZY ET AL　　　1,822,413
MICROMETER
Filed March 2, 1929　　　2 Sheets-Sheet 2
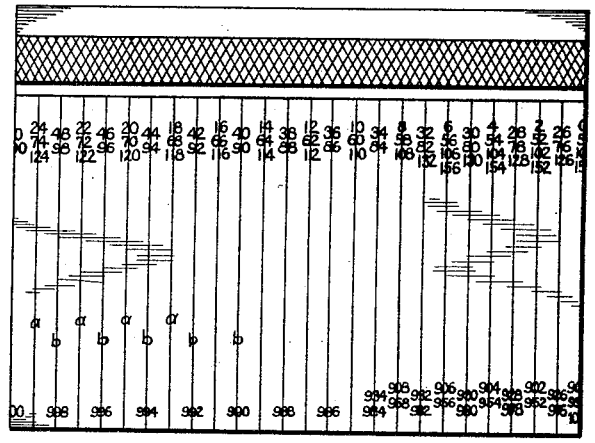
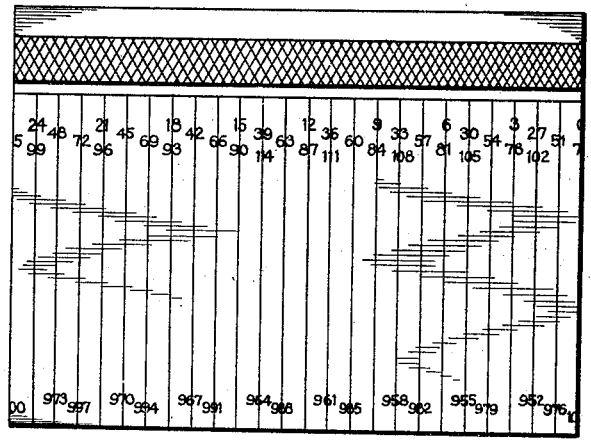
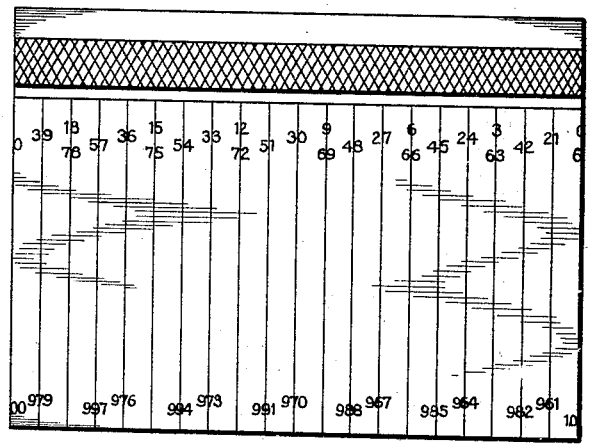
Inventors
ALBERT D. MIZZY
WILLIAM E. FAVINI
By their Attorneys
Bohleber & Ledbetter Patented Sept. 8, 1931

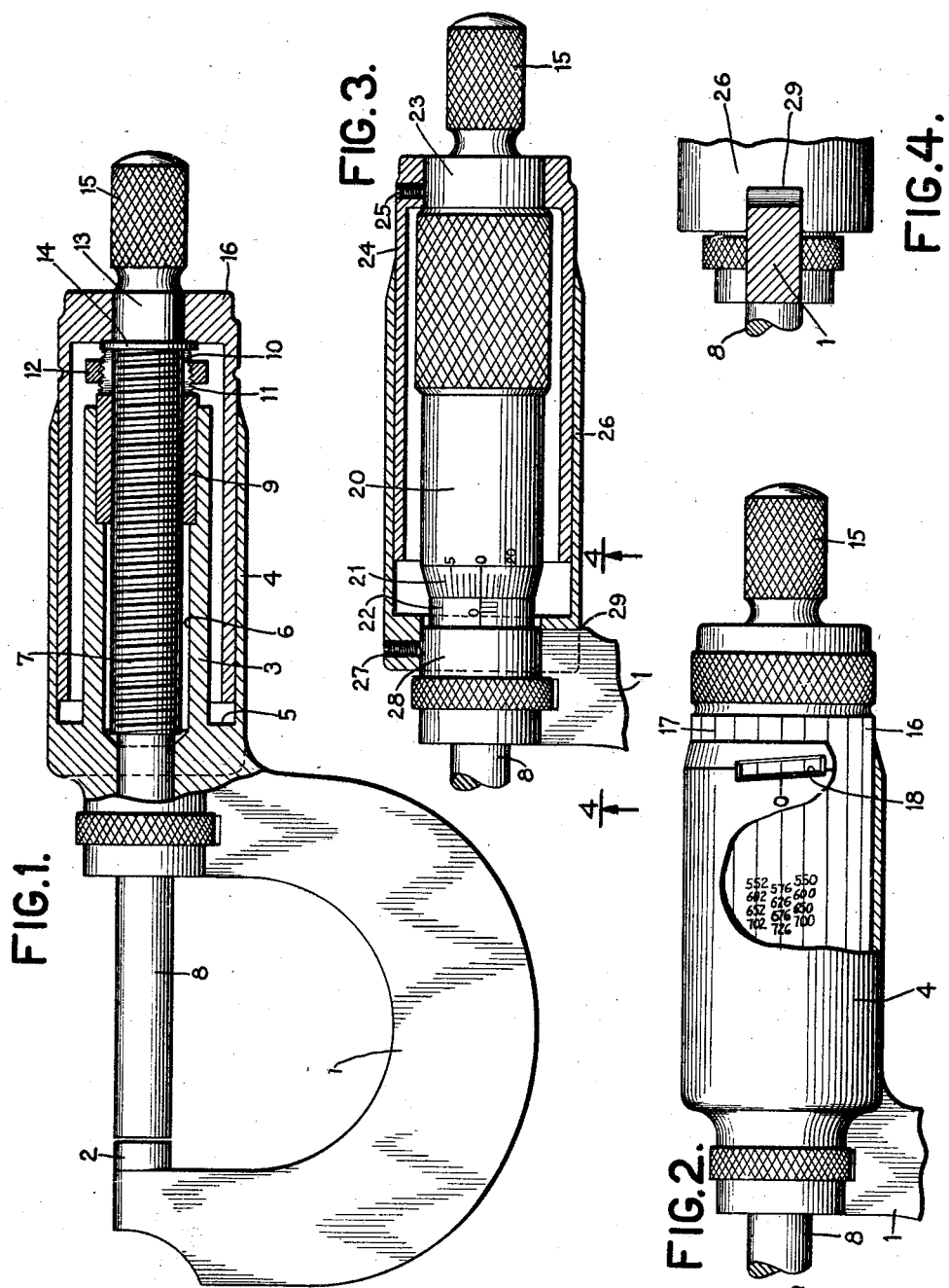

1,822,413

UNITED STATES PATENT OFFICE

ALBERT D. MIZZY, OF NEW YORK, AND WILLIAM E. FAVINI, OF SOUTH OZONE PARK, NEW YORK

MICROMETER

Application filed March 2, 1929. Serial No. 343,872.

This invention has to do with micrometers such as are used generally to measure to one, one thousandths of an inch or any other measurement requiring accuracy.

An object of this invention is to produce a direct reading micrometer in which the graduations on the barrel are numbered with the numerical readings of the graduations which number is formed upon the barrel and is of such size that it may be easily read. The particular object is to produce a numbering system which increases materially the axial space upon the barrel within which a number is to be placed.

Another object of this invention is to provide such a construction that this principle and form of graduations may be provided upon a barrel which is capable of being mounted on all other micrometers. This enables any micrometer having the old form of graduation or system of reading a micrometer measurement to be converted into our direct reading form.

The invention may be more thoroughly understood from the following description and the drawings in which Fig. 1 is a plan view of the micrometer with a section taken through the barrel.

Fig. 2 shows an enlarged view of the barrel with our system of numbering the graduations.

Fig. 3 shows our form of barrel mounted upon a common type of micrometer.

Fig. 4 is a view showing a portion of the index carrying member.

Figs. 5, 6 and 7 are enlarged developments of barrels having our numbering system.

We have shown in Fig. 1 of the drawings, a micrometer caliper having a construction suitable for our system of numbering. In this figure is shown the usual micrometer bow 1 having an anvil 2 secured thereto at one end of the bow. The other end of the bow carries an inner cylinder 3 and a concentric outer cylinder 4 having a cylindrical space 5 therebetween. The inner cylinder 3 has a cylindrical bore 6, through which the micrometer screw 7 passes which screw carries the usual micrometer rod 8. The screw 7 has a pitch of 40 threads per inch which is the usual micrometer caliper pitch. The outer end of the inner cylinder 3 carries a nut 9 which engages the screw 7. The end of the nut 9 has a plurality of slots 10 which renders the end of the nut flexible and is also provided with tapered screw thread 11 which carries an adjusting nut 12. By screwing the adjusting nut 12 along the tapered threads 11 the flexible end of the nut 9 is contracted. This tapered screw thread and nut provide an adjusting means for the nut 9 to take care of wear between the nut and the screw and insuring accuracy in the instrument at all times.

The screw 7 has a cylindrical seat 13 at one end of which is the collar 14 and terminates in an extension 15. Upon the cylindrical seat 13 and against the collar 14 the graduated barrel 16 is securely mounted. This barrel is adapted to freely rotate and move axially within the cylindrical space 5 between the cylinders 3 and 4 and its axial movement is controlled by the screw. Upon the outer surface of the barrel 16, the axial lines 17 are provided and with a screw having a pitch of 40 threads per inch there are 25 such axial graduations in order to read to one one thousandths of an inch. The graduations are uniformly spaced around the circumference of the barrel.

Referring now to Fig. 5 which shows a development of the barrel of the micrometer having a portion of the numerals thereon using the system of numbering in accordance with our invention. With the usual 40 pitch micrometer screw there must be 25 axial graduations around the circumference of the barrel in order to read to one one thousandth of an inch. Now by numbering alternate graduations continuously and in a spiral about the barrel, the pitch of the spiral being equal to the pitch of the screw, it will require two revolutions of the spiral in order to place a numeral upon each graduation of the barrel. This is illustrated in Fig. 5 where the even numbers of digits are used in numbering the alternate graduations. As is evident the series of numerals will be 0, 2, 4, 6, etc., to 24, in one revolution of the spiral. Since there are 25 axial graduations on the barrel, the numerals in the second revolution of the spiral, that is continuing the numbering with the even numerals using alternate graduations must then take those graduations which were not numbered in the first revolution.

Stating it in a somewhat different manner, and lettering one set of alternate axial graduations with the letter $a$ (Fig. 5) and the second set with the letter $b$ then following our system of numbering the even numbers will appear upon the graduations lettered $a$ in the first revolution and upon the second revolution the even numbers will take the $b$ lettered graduations and in the third revolution the even numbers will again take the graduations lettered $a$ and so forth throughout the entire measuring capacity of the barrel.

It will be remembered that the usual micrometer screw has a thread pitch of 40 per inch and therefore by numbering alternate graduations we secure 2/40 or 1/20th of an inch of axial distance within which to place our numerals whereas if one graduation were numbered upon each revolution of the spiral as in the systems used heretofore only 1/40th of an inch of space would be available which is but one half of the vertical or axial space available with our system. This is because the numerals must necessarily be placed in a space whose axial distance is equal to the pitch of the micrometer screw thread.

It is clear that a numeral having a height of 1/40th of an inch is impossible to read and furthermore it is impossible to place such a small numeral upon the barrel. A numeral having twice this height is on the other hand easily read and easily placed upon the barrel.

It will be apparent that in order to use the system of numbering and secure the advantages set out that there must be an odd number of graduations upon the barrel. A micrometer screw having a different pitch than the 40 threads per inch used for illustration above may be used so long as there is an odd number of graduations placed upon the barrel. It is to be understood also that the system of numbering is applicable upon any division of any desired unit and that it is not limited to micrometers for measuring 1/1000th of an inch and the invention contemplates instruments measuring any division of metric units or any other unit of measurement.

The invention has a broader scope than the numbering of alternate graduations and it becomes readily apparent that every third graduation may be numbered (Fig. 6) in which case there must be three revolutions of the numbering spiral before each of the 25 graduations receives a number. By numbering every third graduation, each numeral will have 3/40ths of an inch of axial or vertical distance within which to place the numeral. Similarly every fourth graduation may be numbered in which case 4/40ths of an inch of axial distance or space on the barrel is available for the insertion of a numeral. It will be clear that this numbering of every second, third or fourth graduation is successful so long as the number of graduations about the circumference of the barrel is not a multiple of the unit used. That is if every second graduation is numbered, there must be an odd number of graduations, and if every third graduation is numbered the number of graduations on the barrel must not be a multiple of three and so forth. Any graduation may be numbered with the resultant increased vertical distance betwen numbers if the rule as to number of graduations is followed.

In Fig. 7 is shown a development of a barrel in which the pitch of the micrometer screw has been selected as 50 threads per inch. In order to read 1/1000th of an inch 20 graduations are required upon the barrel and with a barrel of equal diameter as the barrel used with 25 graduations, an increased circumferential distance between graduations and numbers is used. Following the rule set out above numbering every second graduation does not give the result desired since 20 is a multiple of two. Twenty however, is not a multiple of three so that every third graduation may be numbered and the increased axial or vertical space within which to place a numeral is secured and in addition an increased circumferential distance is also obtained.

It is apparent that by enlarging the diameter of the barrel we may secure additional space or in other words additional circumference within which to place our numerals. However, increasing the diameter of the barrel renders the instrument heavier and more cumbersome so that too great an increase in the diameter would not be practical for a micrometer to be carried in the hand. For bench micrometers a larger barrel is not a disadvantage and for these instruments increased circumferential space for numerals is secured. We have found that by keeping the barrel relatively small we have sufficient room within which to put a three digit numeral which may be easily read.

In Fig. 3 we have shown a construction by which we are enabled to mount a direct reading barrel upon any micrometer and convert it into a direct reading instrument. In this figure the usual micrometer barrel 20 is shown having 25 graduations 21 about the rotating barrel and the reading is secured by noting the last visible graduation upon the stationary barrel 22 and adding thereto the reading of the graduation upon the barrel 20. In this type of instrument a cylindrical seat 23 is provided upon which the barrel 24 has the direct reading numerals thereon, is mounted. This barrel is firmly secured to the seat 23 by means of the set screw 25 or it may be driven on. A stationary cylinder 26 carrying an index line is provided with a bore 27 which fits snugly on the seat 28 of the micrometer frame. This cylinder 26 is provided with a notch 29 in which the bow 1 of the frame slides and thereby holding the cylinder 26 against rotation. A set screw may be provided to securely hold this cylinder on the frame 1 although it is not necessary. The stationary barrel may have a window through which the graduation reading is visible.

It will be seen therefore that a direct reading micrometer may be constructed or a common micrometer having the usual graduations requiring interpolation may be converted into a direct reading micrometer. In either type of construction the direct reading numbering is used.

Having described our invention we claim:—

1. A direct reading micrometer having an index member, a cylindrical member, a screw, one of said members being rotatable and advanced by the screw, said cylindrical member having equally spaced axial graduations about its circumference, said graduations being numbered along a spiral having a pitch equal to the pitch of the screw, said numbers being the reading of the graduation indexed by the index member, and being applied to the graduations in arithmetical progression the unit of which progression is greater than one, and the number of said axial graduations being a nonmultiple of the unit.

2. A direct reading micrometer having a screw, a rotatable barrel which is advanced by the screw, a stationary barrel carrying an index point, one of said barrels having equally spaced axial graduations about its circumference, said graduations being numbered along a spiral having a pitch equal to the pitch of the screw, said numbers being the reading of the graduation indexed by the index point, and being applied to the graduations in arithmetical progression the unit of which progression is greater than one, and the number of said axial graduations being a nonmultiple of the unit.

3. A direct reading micrometer having an index point, a screw, a rotatable barrel which is advanced by the screw, said barrel having equally spaced axial graduations about its circumference, said graduations being numbered along a spiral having a pitch equal to the pitch of the screw, said numbers being the reading of the graduation and being applied to the graduations in arithmetical progression the unit of which progression is greater than one, and the number of said axial graduations being a nonmultiple of the unit.

4. A direct reading micrometer having an index means, a screw, a rotatable barrel which is advanced by the screw, said barrel having axial graduations about its circumference, said graduations being numbered along a spiral having a pitch equal to the pitch of the screw, said numbers being applied continuously to alternate graduations.

5. A direct reading micrometer having an index means, a screw, a rotatable barrel which is advanced by the screw, said barrel having an odd number of equally spaced axial graduations, said graduations being numbered along a spiral having a pitch equal to the pitch of the screw, and said numbers being applied continuously to alternate graduations.

6. A direct reading micrometer having an index means, a screw, a rotatable barrel which is advanced by the screw, said barrel having an odd number of equally spaced axial graduations to measure 1/1000 of an inch, said graduations being numbered along a spiral having a pitch equal to the pitch of the screw, and said numbers being applied continuously to alternate graduations.

7. A direct reading micrometer having an index means, a screw, a rotatable barrel which is advanced by the screw, said barrel having an odd number of equally spaced axial graduations, said graduations being numbered along a spiral having a pitch equal to the pitch of the screw, and said numbers being applied to alternate graduations in continuous progression.

8. A direct reading micrometer having an index means, a screw, a rotatable barrel which is advanced by the screw, said screw having a pitch of 40 threads per inch, said barrel having 25 equally spaced axial graduations about the circumference of the barrel to read 1/1000 of an inch, said graduations being numbered along a spiral having a pitch equal to the pitch of the screw, and said numbers being the reading of the graduation and being applied to the graduations continuously in arithmetical progression of a unit greater than one and a non-divisor of twenty-five.

9. A direct reading micrometer having an index means, a screw, a rotatable barrel which is advanced by the screw having a pitch of 40 threads per inch, said barrel having 25 equally spaced axial graduations about the circumference of the barrel to read 1/1000 of an inch, said graduations being numbered along a spiral having a pitch equal to the pitch of the screw, and said numbers being the reading of the graduation and being applied continuously to alternate graduations.

10. A direct reading micrometer converted from a standard screw micrometer with a rotatable barrel comprising a fixed index member secured to the frame of the micrometer, a direct reading rotatable barrel secured externally of the rotatable barrel of the micrometer and advanced by its screw, said rotatable barrel having equally spaced axial graduations about its circumference, said graduations being numbered along a spiral having a pitch equal to the pitch of the screw, said numbers being the reading of the graduation and being applied to the graduations in arithmetical progression of a predetermined unit, the number of said graduations being a nonmultiple of the unit.

11. A direct reading micrometer converted from a standard screw micrometer with a rotatable barrel comprising a stationary barrel secured to the frame of the micrometer, a direct reading rotatable barrel secured externally of the rotatable barrel of the micrometer and advanced by its screw, into the stationary barrel, said rotatable barrel having equally spaced axial graduations about its circumference, said graduations being numbered along a spiral having a pitch equal to the pitch of the screw, said numbers being the reading of the graduation and being applied to the graduations in arithmetical progression of a predetermined unit, the number of said graduations being a nonmultiple of the unit.

12. A direct reading micrometer having an index means, a screw, a rotatable barrel which is advanced by the screw, said barrel having equally spaced axial graduations about its circumference, the number of said graduations being a non-multiple of three, said graduations being numbered along a spiral having a pitch equal to the pitch of the screw, and said numbers being the reading of the graduation and being applied to the graduations in arithmetical progression of three.

13. A direct reading micrometer having a 40 pitch screw, there being an index means on said micrometer, a rotatable barrel which is advanced by the screw, said barrel having 25 equally spaced axial graduations about the circumference of the barrel to read 1/1000th of an inch, said graduations being numbered along a spiral having a pitch equal to the pitch of the screw, and said numbers being the reading of the graduation and being applied continuously to the graduations in arithmetical progression of three.

In testimony whereof we affix our signatures.

ALBERT D. MIZZY.
WILLIAM E. FAVINI.